United States Patent
Höhnke

(10) Patent No.: US 9,671,964 B2
(45) Date of Patent: Jun. 6, 2017

(54) METHOD OF SECURELY ERASING A NON-VOLATILE SEMICONDUCTOR MASS MEMORY, COMPUTER SYSTEM, AND COMPUTER PROGRAM PRODUCT

(71) Applicant: Fujitsu Technology Solutions Intellectual Property GmbH, München (DE)

(72) Inventor: Thorsten Höhnke, Königsbrunn (DE)

(73) Assignee: Fujitsu Technology Solutions Intellectual Property GmbH (DE)

( * ) Notice: Subject to any disclaimer, the term of this patent is extended or adjusted under 35 U.S.C. 154(b) by 0 days.

(21) Appl. No.: 14/758,389

(22) PCT Filed: Nov. 26, 2013

(86) PCT No.: PCT/EP2013/074776
§ 371 (c)(1),
(2) Date: Jun. 29, 2015

(87) PCT Pub. No.: WO2014/114388
PCT Pub. Date: Jul. 31, 2014

(65) Prior Publication Data
US 2015/0331620 A1    Nov. 19, 2015

(30) Foreign Application Priority Data

Jan. 28, 2013    (DE) ........................ 10 2013 100 820

(51) Int. Cl.
*G06F 3/06* (2006.01)
*G06F 21/78* (2013.01)

(52) U.S. Cl.
CPC .......... *G06F 3/0616* (2013.01); *G06F 3/0652* (2013.01); *G06F 3/0679* (2013.01); *G06F 21/78* (2013.01); *G06F 2221/2143* (2013.01)

(58) Field of Classification Search
CPC ............. G06F 21/78; G06F 2221/2143; G06F 3/0679; G06F 3/0652; G06F 3/0616
See application file for complete search history.

(56) References Cited

U.S. PATENT DOCUMENTS

2008/0235443 A1* 9/2008 Chow ................. G06F 12/0851
711/103
2011/0066837 A1* 3/2011 Lee ........................ G06F 9/4401
713/2

(Continued)

FOREIGN PATENT DOCUMENTS

DE    10 2011 018 558 A1    12/2011
JP    2005-327296    11/2005

(Continued)

OTHER PUBLICATIONS

Garbage Collection (Abstract), Wikipedia, Dec. 27, 2012, https://de.wikipedia.org/w/index.php?title=Garbage_Collection&oldid=112115257.

(Continued)

*Primary Examiner* — David X Yi
*Assistant Examiner* — Zubair Ahmed
(74) *Attorney, Agent, or Firm* — DLA Piper LLP (US)

(57) ABSTRACT

A method of securely erasing a non-volatile semiconductor mass memory has a plurality of physical memory units assigned either to a first memory area which can be addressed via an interface of the semiconductor mass memory or to a second memory area which cannot be addressed via the interface, and a controller that changes assignment of the memory units to the first memory area and to the second memory area according to an algorithm that produces wear leveling upon receiving a command to overwrite memory units assigned to the first memory area via the interface.

9 Claims, 3 Drawing Sheets

(56) References Cited

U.S. PATENT DOCUMENTS

| | | |
|---|---|---|
| 2011/0238901 A1 | 9/2011 | Koga et al. |
| 2011/0260999 A1 | 10/2011 | Wang et al. |
| 2012/0246388 A1 | 9/2012 | Hashimoto |
| 2012/0311237 A1 | 12/2012 | Park |
| 2014/0022849 A1* | 1/2014 | Krutzik .................. G06F 21/80 |
| | | 365/185.33 |

FOREIGN PATENT DOCUMENTS

| | | |
|---|---|---|
| JP | 2011-205295 | 10/2011 |
| JP | 2012-198811 | 10/2012 |
| WO | 2012/062233 | 5/2012 |

OTHER PUBLICATIONS

DoD 5220.22-M-Sup 1, National Industrial Security Program Operating Manual Supplement, Feb. 1995, URL:http://www.dtic.mil/whs/directives/corres/pdf/522022MSup1.pdf.

"Method and System for an Optimized Secure Erase of Data on Non-Volatile Data Storage Devices," ip.com PriorArtDatabase Technical Disclosure, Mar. 15, 2011.

Michael Wei et al., "Reliably Erasing Data From Flash-Based Solid State Drives," Department of Computer Science and Engineering, University of California, 2011.

TRIM—Wiipedia, URL:http://web.archive.org/web/20130115104138/http://en.wikipedia.org/wiki/TRIM, Jan. 15, 2013.

Suikan, HDD/SSD, http://d.hatena.ne.ip/suikan/20121126/1353939892, Nov. 26, 2012, along with English translation.

\* cited by examiner

METHOD OF SECURELY ERASING A NON-VOLATILE SEMICONDUCTOR MASS MEMORY, COMPUTER SYSTEM, AND COMPUTER PROGRAM PRODUCT

TECHNICAL FIELD

This disclosure relates to a method of securely erasing a non-volatile semiconductor mass memory having a plurality of physical memory units and a controller. The disclosure also relates to a computer system and a computer program product.

BACKGROUND

Computer systems generally have one or more mass memories for storing data. When replacing such a mass memory, for example, the problem arises of the memory generally containing private or confidential data. These data are intended to be erased before the memory is replaced to prevent misuse of the data. In this case, simple erasure using the operating system generally does not suffice to irrevocably erase the data since the assignment of the file names to physical memory addresses of the mass memory is erased only at the file system level. At the physical level, the data remain substantially in the mass memory. Simple software programs usually suffice to restore these allegedly erased data.

A promising method of erasing these data involves physically destroying the mass memory, the mass memory being demagnetized or mechanically destroyed in another manner, for example. Such methods lend themselves to governments or intelligence services, for example.

However, the mass memories which have been replaced are generally used further, for example, sold in which case it is necessary to securely and irrevocably erase the mass memory by the computer system. In magnetic hard disk drives, there are erasure algorithms for this purpose which generally repeatedly overwrite the memory areas with predetermined bit patterns, with the result that it is virtually impossible to restore the original data.

However, such methods cannot be used in non-volatile semiconductor mass memories since these mass memories fundamentally behave differently from magnetic hard disk memories in terms of organization of data and free storage space owing to the technology. In contrast to a magnetic hard disk memory, it is generally impossible to directly access a particular memory address in the physical memory area in a semiconductor mass memory.

"Reliably Erasing Data From Flash-Based Solid State Drives" by Michael Wei et al. (2011) discloses, for example, that existing erasure methods for magnetic hard disk drives cannot be effectively used in semiconductor mass memories such as solid state drives. Only specific algorithms for controllers of the semiconductor mass memories guarantee the secure erasure of the semiconductor mass memory when implemented correctly. However, this presupposes intervention in the firmware of the respective controller. In addition, firmware is different depending on the manufacturer of the semiconductor mass memory.

It could therefore be helpful to provide a simple method of securely erasing a semiconductor mass memory. It could further be helpful to provide a computer system suitable for carrying out the method and a computer program product.

SUMMARY

I provide a method of securely erasing a non-volatile semiconductor mass memory having a plurality of physical memory units assigned either to a first memory area which can be addressed via an interface of the semiconductor mass memory or to a second memory area which cannot be addressed via the interface, and a controller that changes assignment of the memory units to the first memory area and to the second memory area according to an algorithm that produces wear leveling upon receiving a command to overwrite memory units assigned to the first memory area via the interface, including marking the entire addressable first memory area for erasure; emitting a release command or a TRIM command to the controller via the interface; releasing the physical memory units assigned to the first memory area to be written to by the controller after the release command has been received; emitting at least one first write command to the controller via the interface for the purpose of writing data blocks having a predetermined first bit pattern to the entire first memory area; and emitting at least one second write command to the controller via the interface to overwrite at least one predetermined part of the previously written data blocks with a second bit pattern different from the first bit pattern, the physical memory units assigned to the second memory area being written to according to the algorithm that produces wear leveling.

I also provide a computer system including a non-volatile semiconductor mass memory having a controller and an interface that accesses a first memory area of the semiconductor mass memory via the controller, the interface adapted to receive commands from an operating system or a BIOS and to transmit commands to the controller; and the computer system adapted to carry out the method of securely erasing a non-volatile semiconductor mass memory having a plurality of physical memory units assigned either to a first memory area which can be addressed via an interface of the semiconductor mass memory or to a second memory area which cannot be addressed via the interface, and a controller that changes assignment of the memory units to the first memory area and to the second memory area according to an algorithm that produces wear leveling upon receiving a command to overwrite memory units assigned to the first memory area via the interface, including marking the entire addressable first memory area for erasure; emitting a release command or a TRIM command to the controller via the interface; releasing the physical memory units assigned to the first memory area to be written to by the controller after the release command has been received; emitting at least one first write command to the controller via the interface for the purpose of writing data blocks having a predetermined first bit pattern to the entire first memory area; and emitting at least one second write command to the controller via the interface to overwrite at least one predetermined part of the previously written data blocks with a second bit pattern different from the first bit pattern, the physical memory units assigned to the second memory area being written to according to the algorithm that produces wear leveling.

I further provide a computer program product including executable program code, the method of securely erasing a non-volatile semiconductor mass memory having a plurality of physical memory units assigned either to a first memory area which can be addressed via an interface of the semiconductor mass memory or to a second memory area which cannot be addressed via the interface, and a controller that changes assignment of the memory units to the first memory area and to the second memory area according to an algorithm that produces wear leveling upon receiving a command to overwrite memory units assigned to the first memory area via the interface, including marking the entire addressable first memory area for erasure; emitting a release command or a TRIM command to the controller via the interface; releasing the physical memory units assigned to the first memory area to be written to by the controller after the release command has been received; emitting at least one first write command to the controller via the interface for the purpose of writing data blocks having a predetermined first bit pattern to the entire first memory area; and emitting at least one second write command to the controller via the interface to overwrite at least one predetermined part of the previously written data blocks with a second bit pattern different from the first bit pattern, the physical memory units assigned to the second memory area being written to according to the algorithm that produces wear leveling, being carried out when the program code is executed by a data processing apparatus or a processor.

LIST OF REFERENCE SYMBOLS

Figure 1:
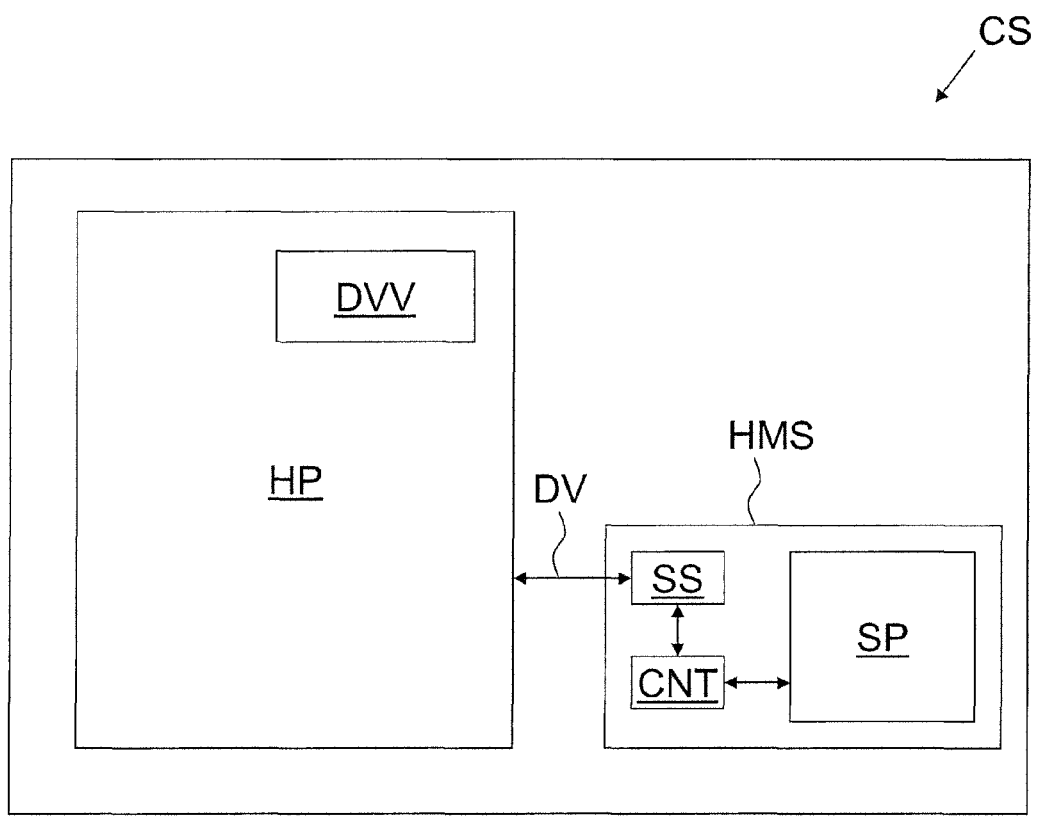
FIG. 1 shows a schematic illustration of a computer system having a non-volatile semiconductor mass memory.

CNT Controller
CS Computer system
D1 to DN File
D1* to D3* File
DV Data connection
DVV Data processing apparatus
HMS Semiconductor mass memory
HP Motherboard
SB1 Memory area
SB2 Memory area
SC1 to SC6 Steps
SP Memory
SS Interface
V Method

DETAILED DESCRIPTION

I provide a method of securely erasing a non-volatile semiconductor mass memory. The semiconductor mass memory has a plurality of physical memory units assigned either to a first memory area which can be addressed via an interface of the semiconductor mass memory or to a second memory area which cannot be addressed via the interface. The semiconductor mass memory also has a controller set up to change the assignment of the memory units to the first memory area and to the second memory area according to an algorithm that produces wear leveling upon receiving a command to overwrite memory units assigned to the first memory area via the interface. The method has the following steps of:
  marking the entire addressable first memory area for erasure;
  emitting a release command, in particular a TRIM command, to the controller via the interface;
  releasing the physical memory units assigned to the first memory area for the purpose of being written to by the controller after the release command has been received;
  emitting at least one first write command to the controller via the interface for the purpose of writing data blocks having a predetermined first bit pattern to the entire first memory area; and
  emitting at least one second write command to the controller via the interface for the purpose of overwriting at least one predetermined part of the previously written data blocks with a second bit pattern which is different from the first bit pattern, the physical memory units assigned to the second memory area being written to according to the algorithm that produces wear leveling.

The method may provide for the entire physical memory area of a non-volatile semiconductor mass memory to be erased and to be overwritten with a predetermined bit pattern. In this case, both the first memory area which can be addressed via the interface of the semiconductor mass memory and the second memory area which cannot be addressed via the interface are erased and overwritten. Therefore, it is substantially impossible to restore the erased data. The method can also be used independently of the manufacturer of the semiconductor mass memory and does not presuppose any knowledge or intervention in the firmware of the controller of the semiconductor mass memory.

Advantageously, in the marking step, the semiconductor mass memory may be formatted with a predetermined file system. In addition, in the steps of emitting the first write command and the second write command, files having a file size corresponding to an integer multiple of the size of a block or cluster of the file system are written. This makes it possible to fully write to all physical memory units of the semiconductor mass memory when writing files.

Further advantageously, the file system may be a file system without metafiles, in particular FAT16 or FAT32. File systems containing metadata, for example, NTFS create metadata in a special memory area of the mass memory, which metadata store management information. For example, details of the organization of the storage medium and additional information relating to the stored data such as access rights or information relating to locations at which the data are physically stored are stored. These metadata are generally inaccessible to a user and cannot be readily erased and overwritten. They are likewise a security risk with respect to restoring erased private or confidential data. The use of a file system without metafiles ensures that the entire memory area can be erased.

Still further advantageously, the files may comprise containerless files. Containerless files generally have content stored in binary form without change in a manner corresponding to coding, for example, ASCII. When creating a containerless file using an operating system, for example, its content and size can therefore be stipulated exactly. In contrast, a container file contains, for example, a plurality of files or file blocks which may differ with regard to their file type or file format. Container files additionally generally have automatically generated so-called "header files," that is to say header data, which specify, for example, the internal structure of the container file, for example, the arrangement of the files inside the container file according to their file formats. Therefore, the size and content of a container file cannot be stipulated exactly.

Yet further advantageously, the first bit pattern may comprise the hexadecimal value 0xFF. This makes it possible to write logic ones to the memory area of the semiconductor mass memory. It is virtually impossible to reconstruct erased files or data of the semiconductor mass memory using a memory area filled with logic ones.

I also provide a computer system having a non-volatile semiconductor mass memory having a controller and an interface that accesses a first memory area of the semiconductor mass memory via the controller. The interface receives commands from an operating system or a BIOS (basic input output system) and transmits commands to the controller. The computer system also carries out my methods.

I further provide a computer program product comprising executable program code, and a method carried out when the program code is executed by a data processing apparatus, in particular a processor.

The computer system and the computer program product have substantially the advantages mentioned above.

Further advantages are disclosed in the following detailed description of an example.

The example is described below with reference to the appended figures.

FIG. 1 shows a computer system CS having a motherboard HP. The motherboard HP has a data processing apparatus DVV, for example, a processor. The motherboard HP connects to a non-volatile semiconductor mass memory HMS, for example, a so-called solid state drive, via a data connection DV, for example, a bus line. The semiconductor mass memory HMS has an interface SS connected to a mass memory controller on the motherboard HP via the data connection DV. The semiconductor mass memory HMS also has a memory SP connected to the interface SS via a controller CNT. The memory SP comprises, for example, one or more semiconductor memory modules, for example, flash EEPROMs.

FIG. 1 shows only those components of the computer system CS relevant to explaining the system. Further components, for example, power supplies for the motherboard HP or the semiconductor mass memory HMS have been dispensed with for better clarity.

All known connection standards, for example, IDE-ATA (integrated disk electronics-advanced technology attachment), SATA (serial advanced technology attachment), SAS (serial attached small computer system interface) or FC (fiber channel), are possible as the data connection DV between the motherboard HP and the semiconductor mass memory HMS.

The memory SP of the semiconductor mass memory HMS is based on a NAND memory architecture. However, the memory SP can also be based on a NOR memory architecture.

NAND semiconductor mass memories have a serial arrangement of memory cells, in particular transistors, connected in a manner similar to a NAND gate. The memory SP consists of physical memory units also referred to as "pages" or else blocks and combine a multiplicity of individual memory cells. The physical memory units usually have a size of 4096 bytes or 4 kilobytes (KB). These physical memory units can be individually read by the controller CNT. During writing or erasing operations, the physical memory units are generally combined, however, in particular in flash memories, to form so-called "erasable blocks" comprising 64 or 128 individual physical memory units, for example. When writing data, data are always written to free physical memory units of an erasable block. If a physical memory unit which has already been written to in an erasable block is changed, for example, by overwriting data, the content of the changed physical memory unit is written to the next free physical memory unit of the erasable block. The physical memory unit which was originally written to is not erased but rather is only marked as "not up-to-date."

Only when all physical memory units of an erasable block have been marked as "not up-to-date" is the entire erasable block erased or released for overwriting.

The memory SP is also subdivided into a first memory area which can be addressed via the interface SS and a second memory area which cannot be addressed via the interface SS. The first memory area has a size of 128 GB, for example. The first memory area is also referred to as a visible memory area and the second memory area is referred to as an invisible memory area. The interface SS is used to address a logical memory area or logical memory units of a file system, to which physical memory units of the first memory area are assigned by the controller CNT. It is impossible to directly access physical memory units of the second memory area of the memory SP via the interface SS using standardized protocols. The second memory area contains memory units which have been released for erasure, for example.

The controller CNT of the semiconductor mass memory HMS changes the assignment of the physical memory units to the first memory area and to the second memory area according to an algorithm that produces wear leveling of the memory units upon receiving a command to write to or overwrite physical memory units assigned to the first memory area via the interface SS. In this case, a distinction is made between static and dynamic wear leveling.

If the intention is to write to an erasable block, the controller CNT always writes to the erasable blocks of the first memory area or of the second memory area which have not already been written to and have been written to or worn least frequently during dynamic wear leveling. A number of writing operations and therefore the wear of an erasable block are generally stored by the controller CNT. If an erasable block of the second memory area is written to in this case, this erasable block is assigned to the first memory area instead of an unused erasable block of the first memory area.

During static wear leveling, not only the wear of erasable blocks which have not been written to but also the wear of erasable blocks which have already been at least partially written to are taken into account for the wear leveling. If the intention is to write to an erasable block, the least worn erasable block is selected. If this erasable block has been at least partially written to, the data in the erasable block which has been written to are copied to physical memory units of another erasable block, with the result that the erasable block which has not been written to much is released for the writing operation. The controller CNT of the semiconductor mass memory HMS therefore guarantees that uniform wear of all physical memory units or erasable blocks of the semiconductor mass memory HMS is ensured.

On account of the wear leveling, it is not possible, for example, to deliberately erase and/or overwrite the entire memory area of the semiconductor mass memory HMS, in particular the second memory area, via an operating system or BIOS using conventional methods which are used, for example, in magnetic hard disk drives.

The computer system CS carries out a method of securely erasing the semiconductor mass memory HMS. The method is described below using FIGS. 2, 3 and 4.

Figure 2:
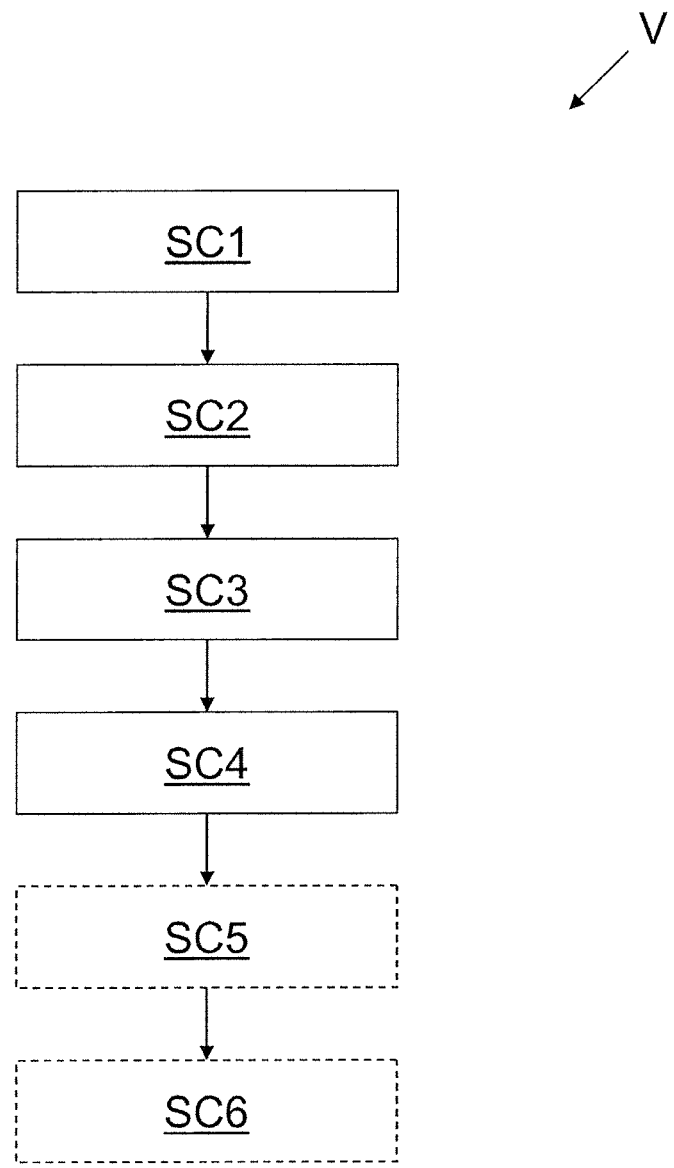
FIG. 2 shows a flowchart of a method of securely erasing the semiconductor mass memory.

FIG. 2 shows a flowchart for a method V which can be carried out by a computer system CS according to FIG. 1. For example, the data processing apparatus DVV executes program code which carries out the method V.

Figure 3:
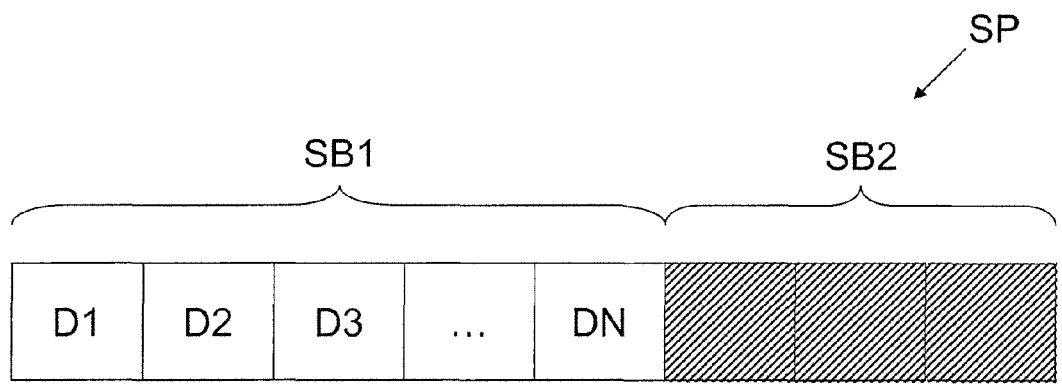
FIG. 3 shows a first schematic illustration of memory areas of the semiconductor mass memory.
Figure 4:
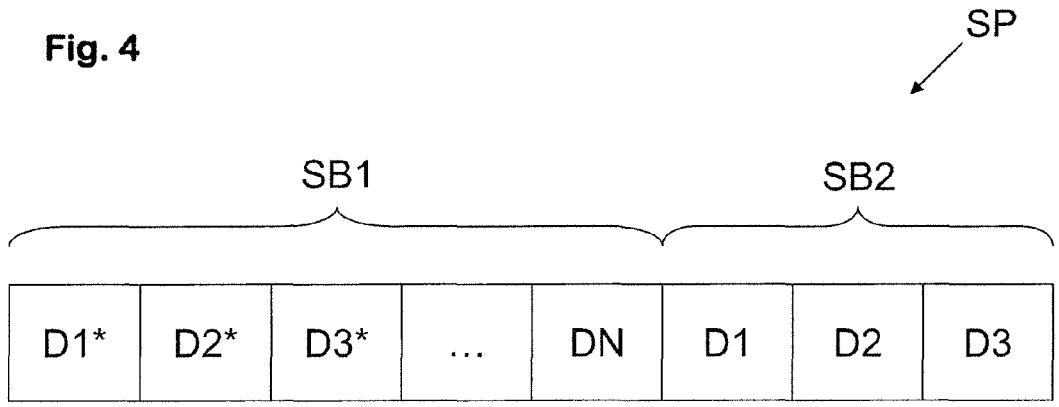
FIG. 4 shows a second schematic illustration of memory areas of the semiconductor mass memory.

FIGS. 3 and 4 schematically show the memory SP of the semiconductor mass memory HMS according to FIG. 1. As described above, the memory SP has a first memory area SB1, also referred to as a visible memory area, and a second memory area SB2 also referred to as an invisible memory area.

In the example described using FIGS. 1 to 4, commands are emitted to the controller via the interface SS by an operating system of the computer system CS. Alternatively, the commands can also be emitted using a BIOS or an application program.

In a first step SC1 of the method V, the entire addressable first memory area (SB1) is marked for erasure. For example, the first memory area SB1 is formatted with a file system without metafiles. Different specifications can be used for the manner in which the file system is structured. For example, such specifications are FAT16 or FAT32 for Microsoft DOS-based and Windows-based operating systems. In the example illustrated, use is made of the file system FAT32 having a cluster size of 4 KB. Other cluster sizes, for example, 2 KB or 16 KB, are also possible. One physical memory unit is therefore allocated to a cluster having a size of 4 KB. Files which are stored in the semiconductor mass memory HMS always occupy an integer multiplicity of clusters even if their actual size does not correspond to a multiple of the cluster size.

During formatting, the logical memory area is erased at the operating system level. In this case, the controller CNT of the semiconductor mass memory HMS receives the information for erasure via the interface SS and records the physical memory units assigned to the logical memory area as "invalid" or "not up-to-date." However, the physical memory units of the first memory area SB1 which are assigned to the logical memory area are not securely erased at first. This results, for example, in data of physical memory units which have been marked as "invalid" being copied to other erasable blocks according to the wear leveling, in particular the static wear leveling, even though these data are no longer required.

In a next step SC2, a release command, in particular an ATA-TRIM command, is therefore emitted to the controller CNT via the interface SS. In this case, the operating system informs the controller CNT via the interface SS that physical memory units which have been erased or have been released in another manner in the logical memory area are no longer used and/or the data of these physical memory units are obsolete. If all physical memory units of an erasable block are no longer used, the erasable block can be released for writing to and/or erased by the controller CNT. As a result of the fact that the entire logical memory area was formatted in step SC1, the controller CNT is informed in step SC2 that all physical memory units of the first memory area SB1 which are "not up-to-date" can be released and/or erased. This results, for example, in these data no longer being copied to free erasable blocks on account of the wear leveling.

In a next step SC3, at least one first write command is emitted to the controller CNT via the interface SS for the purpose of writing data blocks having a predetermined first bit pattern to the entire first memory area SB1. The data blocks are data from containerless files D1 to DN (see FIG. 3), for example, text files which have been directly created using calls of an operating system, for example, and contain a sequence of the hexadecimal value 0xFF. The hexadecimal value 0xFF corresponds to the binary code 11111111, that is to say one byte in which all bits have been set. In the example, the files D1 to DN each have a size of an erasable block of the file system, that is to say 256 KB, for example. When writing the files D1 to DN, the controller selects the least worn erasable blocks according to the wear leveling and writes to their physical memory units. If physical memory units of released erasable blocks which have not yet been erased are selected here in step SC2, they are erased before being written to. In this case, the erasable blocks which have been written to in step SC3 are assigned to the first memory area SB1.

In step SC3, so many files are written that logic ones are written to the entire first memory area SB1 which can be addressed via the interface SS. A file having a size differing from a multiple of the size of a cluster or erasable block could result in not all physical memory units of the first memory area SB1 being written to.

In a next step SC4, at least one second write command is now emitted to the controller CNT via the interface SS for the purpose of overwriting at least one predetermined part of the previously written data blocks with a second bit pattern different from the first bit pattern. In this case, a part of the files previously written in step SC3 is overwritten with changed files.

The part of the previously written files is overwritten with files having a second bit pattern, the second bit pattern having been changed compared to the first bit pattern. In this case, an only small change is sufficient, for example, changing one of the plurality of hexadecimal values 0xFF of a file to the hexadecimal value 0xFE or the binary code 11111110. This means that 1 bit of a file must be changed, for example. When overwriting the files, the physical memory units of erasable blocks of the files to be overwritten in the first memory area SB1 are now not overwritten according to the wear leveling described above. Instead, the new files are written to physical memory units of erasable blocks of the second memory area SB2 since this memory area has the only free erasable blocks or erasable blocks which have been released for overwriting. The physical memory units or erasable blocks containing the data from the changed files are assigned to the first memory area SB1. The original physical memory units or erasable blocks of the first memory area SB1 containing the first bit pattern are now assigned to the second memory area SB2 by the controller CNT.

The practice of emitting the at least one second write command to the controller CNT via the interface SS is demonstrated using the example of overwriting the file D1 by reference to FIGS. 3 and 4. In this case, the files D1 to DN having a predetermined first bit pattern have already been written to the entire memory area SB1 according to FIG. 3. In this case, the files D1 to DN each have the size of an erasable block, for example, 16 KB. If the controller CNT now receives the command indicating that the physical memory units of the erasable block which form the basis of the file D1 are intended to be overwritten with data from a changed file D1* of the same size, the content of the new file D1* is written to physical memory units of an erasable block which was previously assigned to the second memory area SB2. In this case, the erasable block of the original file D1 is assigned to the second memory area SB2, the erasable block of the new file D1* now being assigned to the first memory area SB1 (see FIG. 4). The files D2 and D3 have been overwritten with changed files D2* and D3* in a similar manner according to FIG. 4.

Alternatively, the files may also have a different size. The prerequisite is that the size of the files corresponds to a multiple of the size of a cluster and an erasable block of the file system. When overwriting the files with changed files according to step SC4, all data from the changed files are generally written to the second memory area SB2 according to the wear leveling even if the change in the file itself concerns only data of a physical memory unit.

For example, on the basis of the wear leveling algorithm, when overwriting a file which has already been written and has the size of two erasable blocks with a changed file of the same size in which only one bit has been changed compared to the file which has already been written, the changed file would be completely written to two erasable blocks of the second memory area SB2 which are then assigned to the first memory area SB1 instead of the original erasable blocks of the overwritten file.

In the method V, at least so many files are changed or overwritten that the entire second, invisible memory area SB2 is written to.

Depending on the manufacturer of the semiconductor mass memory HMS, the invisible second memory area SB2 may be approximately 6 to 15% of the size of the first memory area SB1. Therefore, after more than 15% of the first memory area SB1 has been overwritten, for example, it is ensured that the entire second memory area SB2 receives only useless data. Alternatively, considerably more files can also be changed or overwritten. The files having the second bit pattern may also again be overwritten with files having a recently changed bit pattern, for example, the first bit pattern again. The security is increased by virtue of the fact that all physical memory units of the semiconductor mass memory are irrevocably erased or overwritten.

To increase the security further such that erased data of a semiconductor mass memory cannot be restored, the method V can also be carried out repeatedly, for example, two or three times in succession.

Therefore, the entire physical memory area of the semiconductor mass memory HMS has now been written to and it is no longer possible to reconstruct the data previously stored therein with a reasonable amount of effort. It is therefore easily possible to erase a non-volatile semiconductor mass memory independently of the manufacturer. As described, this can be carried out using the operating system or else using the BIOS. Therefore, there is no need to intervene in the manufacturer-dependent firmware of the semiconductor mass memory HMS or to directly access the controller CNT of the semiconductor mass memory HMS.

Owing to the technology, defective memory units or memory cells of a semiconductor mass memory must not be considered for secure erasure since they generally no longer contain any valid information on account of defective floating gates of the transistors.

In another example, the method V may additionally have a fifth step SC5 which is illustrated using dashed lines in FIG. 2 and according to which the ATA-TRIM command is executed again. In a sixth step SC6 is likewise illustrated using dashed lines in FIG. 2, the semiconductor mass memory HMS can additionally be formatted with a predetermined file system. This may also be, for example, a file system containing metainformation, for example, NTFS. The semiconductor mass memory HMS is therefore prepared for further use. The semiconductor mass memory HMS is preferably formatted with the same file system which was used before execution of the method V.

The invention claimed is:

1. A method of securely erasing a non-volatile semiconductor mass memory, the mass memory having a memory, an interface and a controller, wherein the memory of the semiconductor mass memory has a plurality of physical memory units assigned either to a first memory area which can be addressed via an interface of the semiconductor mass memory or to a second memory area which cannot be addressed via the interface, the interface receives commands from an operating system or a BIOS and transmits commands to the controller, the interface addresses a logical memory area or logical memory units of a file system to which physical memory units of the first memory area are assigned by the controller;

and wherein the controller changes assignment of the memory units to the first memory area and to the second memory area according to an algorithm that produces wear leveling upon receiving a command to overwrite memory units assigned to the first memory area via the interface, the method comprising:

marking the entire addressable first memory area for erasure;

emitting a release command to the controller via the interface;

releasing the physical memory units assigned to the first memory area to be written to by the controller after the release command has been received;

emitting at least one first write command by the operating system or the BIOS to the controller via the interface for the purpose of writing data blocks having a predetermined first bit pattern to the entire first memory area such that the entire first memory area is overwritten with the first bit pattern; and emitting at least one second write command by the operating system or the BIOS to the controller via the interface to overwrite at least one predetermined part of the previously written data blocks with a second bit pattern different from the first bit pattern, the physical memory units assigned to the second memory area being written to according to the algorithm that produces wear leveling such that the entire physical memory area of the non-volatile semiconductor is erased and overwritten with a predetermined bit pattern.

2. The method according to claim 1, wherein, in the marking step, the semiconductor mass memory is formatted with a predetermined file system and, in emitting the first write command and the second write command, files having a file size corresponding to an integer multiple of the size of a block and/or cluster of the file system are written.

3. The method according to claim 2, in which the file system is a file system without metafiles, in particular FAT16 or FAT32.

4. The method according to claim 2, in which the files comprise containerless files.

5. The method according to claim 1, in which the first bit pattern comprises the hexadecimal value 0xFF.

6. A computer system comprising:

a non-volatile semiconductor mass memory having a controller and an interface that accesses a first memory area of the semiconductor mass memory via the controller, the interface adapted to receive commands from an operating system or a BIOS and to transmit commands to the controller; and the computer system adapted to carry out a method according to claim 1.

7. A computer program product comprising executable program code, a method according to claim 1 being carried out when the program code is executed by a data processing apparatus or a processor.

8. The method according to claim 1, wherein the commands emitting a release command or a TRIM command, emitting at least one first write command and emitting at least one second write command, are emitted by an operating system or a BIOS system.

9. A method of securely erasing a non-volatile semiconductor mass memory, the mass memory having a memory, an interface and a controller, wherein the memory of the semiconductor mass memory has a plurality of physical memory units assigned either to a first memory area which can be addressed via the interface of the semiconductor mass memory or to a second memory area which cannot be addressed via the interface, the interface is adapted to receive commands from an operating system or a BIOS and transmit commands to the controller, the interface addresses a logical memory area or logical memory units of a file system to which physical memory units of the first memory area are assigned by the controller;

and wherein the controller changes assignment of the physical memory units to the first memory area and to the second memory area according to an algorithm that produces wear leveling upon receiving a command to overwrite memory units assigned to the first memory area via the interface, the method comprising:

marking the entire addressable first memory area for erasure;

emitting a release command to the controller via the interface;

releasing the physical memory units assigned to the first memory area to be written to by the controller after the release command has been received;

emitting at least one first write command by the operating system or the BIOS to the controller via the interface for the purpose of writing data blocks having a predetermined first bit pattern to the entire first memory area such that the entire first memory area is overwritten with the first bit pattern; and emitting at least one second write command by the operating system or the BIOS to the controller via the interface to overwrite at least one predetermined part of the previously written data blocks with a second bit pattern different from the first bit pattern, the physical memory units assigned to the second memory area being written according to the algorithm that produces wear leveling such that the entire physical memory area of the nonvolatile semiconductor is erased without directly accessing the physical memory cells of the memory via the interface.

* * * * *